*J. H. Guild,*

*Water Cut-Off.*

Nº 64,663.  Patented May 14, 1867.

Witnesses:  Inventor

United States Patent Office.

J. H. GUILD, OF RUPERT, VERMONT.

Letters Patent No. 64,663, dated May 14, 1867.

---

IMPROVEMENT IN FLOAT-VALVES.

---

*The Schedule referred to in these Letters Patent and making part of the same.*

---

TO ALL WHOM IT MAY CONCERN:

Be it known that I, J. H. GUILD, of Rupert, Bennington county, Vermont, have invented a new and improved Device for Regulating the Flow of Liquids; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
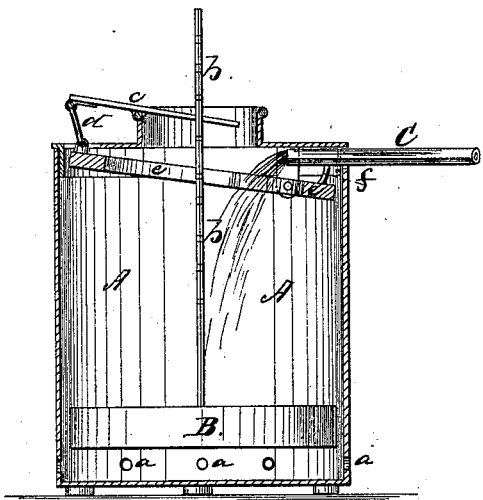
Figure 1 represents a sectional elevation of my apparatus.
Figure 2:
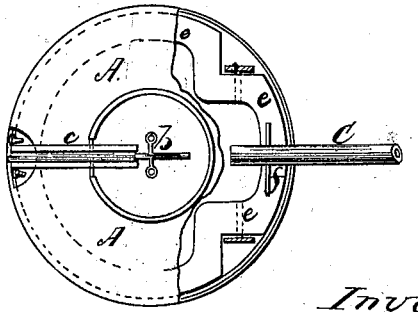
Figure 2 is a plan or top view of the same, partly in section.

This invention relates to a device whereby the flow of liquids into vessels of any description may be regulated, so that the liquid may not rise above a certain mark.

The object of this invention is to so arrange the apparatus that the valves which were heretofore used in similar devices, and which do generally get out of order after having been used for some time, may be done away with. For this purpose I make use of an India-rubber or other flexible tube, through which the liquid is fed into the pan. As soon as the latter rises in the pan to a certain mark, it raises a float which is connected with a system of levers, whereby, as soon as the float is raised, the end of the flexible tube is compressed. The liquid is thus prevented from flowing through the tube. As soon as the liquid in the pan diminishes the float will be lowered and the tube opened again. The great value of this tube is that it cannot get out of order. When, by wear or otherwise, that part where it is compressed should be torn, the end of the tube can be cut off and the tube moved forward and used again, and, if totally destroyed, can be easily renewed. This invention is particularly applicable to the feeding of sap to the evaporating-pan, but may be used with equal advantage for other purposes.

A represents a cylindrical or other upright vessel, which is placed into the pan, into which the liquid is to be filled. A float, B, is arranged in the vessel A, made of any suitable material. The liquid is poured into the vessel A from any suitable receptacle through an India-rubber or other flexible tube, C, the end of which passes through a hole provided in the side of A, as shown. At the bottom of the vessel A are provided holes $a$ $a$, through which the liquid flows into the pan or vessel in which A stands. To the float B is secured a vertical rod, $b$, which is perforated, or otherwise so arranged that it may be secured to an oscillating lever, $c$, which connects by a link, $d$, with lever $e$, as shown. The lever $e$ is provided with a projection, $f$, directly under the tube C, as shown, so that, as the float is raised, the lever $c$ will depress that end of $e$ which is opposite to the end of the tube C, and thus the projection $f$ will be raised and will press against the tube C, against the cover of the vessel A, and compress the end of the tube, preventing any further flow of liquid through it. As soon as the float is lowered the tube C will again be opened.

I claim as new, and desire to secure by Letters Patent—

The arrangement, in the perforated vessel A, of the float B having the perforated or notched vertical rod $b$ engaging with the pivoted oscillating lever $c$, connected by the link $d$ to the lever $e$, pivoted to the opposite side of the vessel in such a manner that as the float B is elevated by the water the projection $f$ upon said lever $e$ presses against the elastic pipe C, effectually closing the same, substantially as described and for the purpose specified.

J. H. GUILD.

Witnesses:
WM. F. McNAMARA,
ALEX. F. ROBERTS.